Feb. 16, 1926.
H. O. SCRANTON
TRUCK
Filed August 22, 1924    2 Sheets-Sheet 1
1,573,329
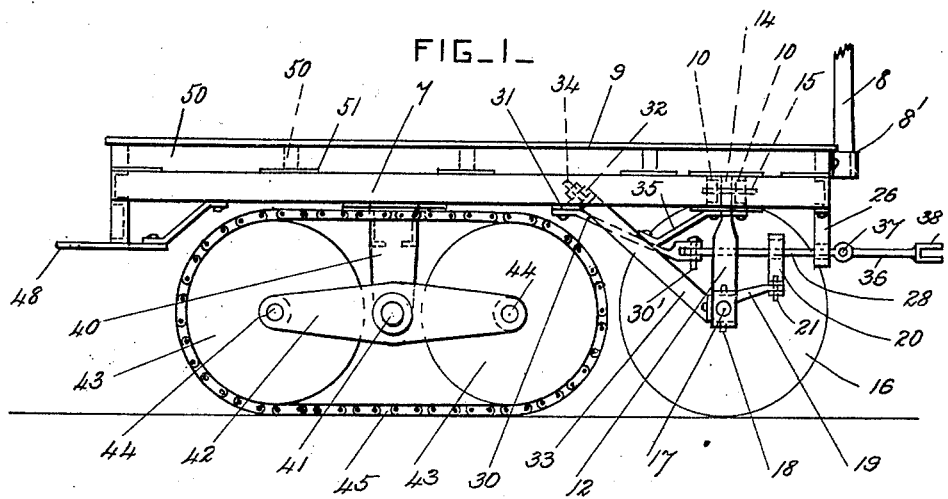
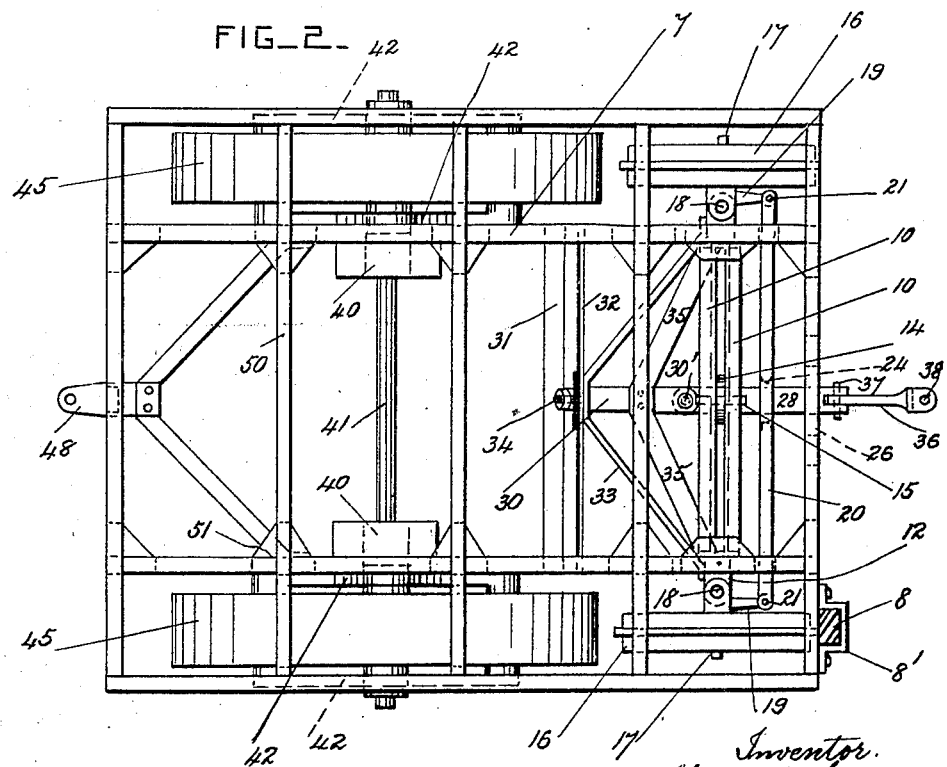
Inventor.
Henry O. Scranton
by Herbert H. Penner
attorney.

Feb. 16, 1926.　　　　　　　　　　　　　　　　1,573,329
H. O. SCRANTON
TRUCK
Filed August 22, 1924　　2 Sheets-Sheet 2
FIG_3_
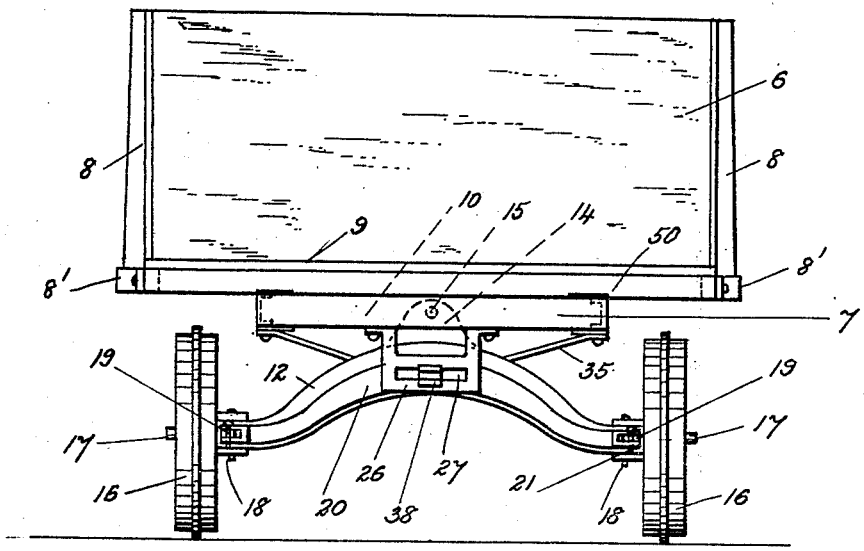
FIG_4_
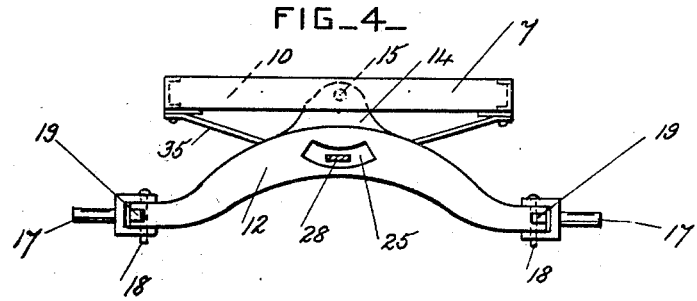
FIG_5_
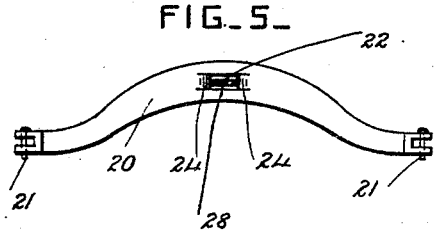
Inventor
Henry O. Scranton
by Herbert W. Jenner,
Attorney.

Patented Feb. 16, 1926.

1,573,329

UNITED STATES PATENT OFFICE.

HENRY O. SCRANTON, OF JEANERETTE, LOUISIANA.

TRUCK.

Application filed August 22, 1924. Serial No. 733,584.

*To all whom it may concern:*

Be it known that I, HENRY O. SCRANTON, a citizen of the United States, residing at Jeanerette, in the parish of Iberia and State of Louisiana, have invented certain new and useful Improvements in Trucks, of which the following is a specification.

This invention relates to trucks adapted to be coupled to tractors as trailers, and more particularly to trucks specially adapted for use in harvesting sugar canes and coupled as trailers to harvesting machines which cut down and trim the canes. Trucks of this kind have to pass over ground which is rough, soft and moist, and they are constructed accordingly, and so that the load may be dumped at the rear end of the truck with facility. This invention consists in the novel construction and combination of the parts hereinafter fully described and claimed whereby these advantages are obtained.

In the drawings, Figure 1 is a side view of a truck constructed according to this invention with the body or box omitted. Fig. 2 is a plan view of the truck shown in Fig. 1, with the platform or floor omitted. Fig. 3 is a front end view of the truck showing the body or box. Fig. 4 is a detail front view of the front axle. Fig. 5 is a front view of the coupling bar.

The body or box 6 is formed of removable sides which are secured to a horizontal frame 7, and are held in place by removable stakes 8 which project from sockets 8' on the frame. A platform or floor 9 is secured on top of the frame, and forms the bottom of the body or box. The frame 7 is preferably formed of metal bars and plates suitably secured together. Two girders 10, channel-shaped in cross-section are secured crosswise of the frame at its front end portion, and 12 is the front axle which is arch-shaped in form. The axle 12 has a lug 14 at its middle part which is arranged between the girders 10, and pivoted to them by a horizontal pin 15.

The front ground wheels 16 are mounted on stub axles 17 which are pivoted to the axle 12 by vertical pins 18. Each stub axle has a forwardly projecting steering arm 19, and 20 is a coupling bar having its ends pivoted to the arms 19 by pins 21. The coupling bar is also arch-shaped in form, and it has an opening 22 at its middle part having rounded side edges 24. The middle part of the axle 12 has a curved slot 25 arranged concentric with its pivot pin 15 and in line with the opening 22 of the coupling bar.

A bracket 26 is secured at the front end of the frame, and it has a horizontal slot 27 arranged in front of the opening in the coupling bar. The draw bar 28 is arranged in the slot 25, opening 22 and slot 27. The rear end portion of the draw bar is pivoted to an anchor bar 30 by a vertical pin 30', and its middle portion is arranged to engage sidewise with the opening 22 of the coupling bar. The front end portion of the draw bar is slidable laterally in the slot 27 of the bracket, and the curved slot 25 of the axle is slidable over the draw bar and also permits the slight lateral movement of the rear part of the draw bar.

The rear end of the anchor bar 30 is secured to a crossbar 31 secured to the frame and provided with an upwardly and forwardly inclined flange or anchor member 32. A forked radius rod 33 has its front ends secured to the end portions of the axle, and it is provided with a pivot 34 at its rear and middle part which is mounted to rock in a hole in the part 32. The middle part 32' of the flange 32 is arranged to project vertically, and the pivot 34 of the radius rod is mounted to rock in this vertical part 32', and is arranged in line with the pivot pin 15 of the axle. This radius rod extends forwardly and downwardly from the crossbar 31 and relieves the strains on the end portions of the axle, and permits it to rock in a vertical plane crosswise of the truck.

The front end portion of the anchor bar is rigidly secured to the frame 7 by braces 35. A draft link 36 is pivoted by a horizontal pin 37 to the front end portion of the draw bar, and has an eye 38 at its front end for connecting it to the tractor or harvesting machine which draws the truck along.

The rear end portion of the frame is provided with brackets 40 in which a rear axle 41 is secured. Rocking frames 42 are mounted at their middle parts on the end portions of the rear axle, and wheels 43 are journaled on pins 44 in the end portions of each of the frames 42. An endless band 45, formed of plates jointed together, is arranged around each pair of wheels 43, and rests on the ground like the traction band of a caterpillar tractor. The endless bands and the front ground wheels are made with extensive bearing surfaces so that they will support the truck on soft and moist ground, and permit it to be drawn along freely.

The rear axle forms a pivot for the truck, and it is arranged a little to the rear of the center of gravity of the truck. The canes are loaded into the truck, and may be discharged by hand or by a crane, or the end side of the body or box may be removed and the whole truck may be tilted upon its rear axle so as to dump the load. A draft connection 48 is secured to the rear of the truck, so that the draft link of another similar truck can be connected to it, if desired.

The truck follows the tractor or harvester around curves because the draft bar steers it by turning the stub axles of the front ground wheels on their pivots in appropriate directions.

The pivotal connection of the front axle with the frame permits each front ground wheel to move vertically; and the pivoted connection of the frames 42 with the rear axle permits each wheel 43 and the end portions of the endless bands 45 to move vertically. This arrangement permits the truck to be drawn over rough and uneven ground with facility and smoothness, and renders it specially well adapted to transport sugar canes. The endless bands 45 of articulated or jointed members may be left off, and the rear wheels may bear directly on the ground, if desired, but it is advantageous to use the endless bands on account of the increased bearing surface furnished by them.

The floor or bottom 9 of the box 6 rests on wooden joists 50, which are secured to the metal frame 7, and the joists and floor project laterally over the ground wheels. Gasset plates 51 are provided to secure the joists to the metal frame and to strengthen them.

What I claim is:

1. In a truck, a frame, a front axle pivoted by a horizontal pivot to the frame and provided with a slot, stub axles pivoted to the front axle and provided with steering arms, front wheels mounted on the stub axles, a coupling bar secured between the steering arms, and a draw bar having its rear end pivotally connected with the said frame by a vertical pivot and projecting through the slot in the front axle and operatively connected with the coupling bar so as to steer the front wheels.

2. In a truck, a frame, a front axle pivoted by a horizontal pivot to the frame and provided with a slot, stub axles provided with forwardly projecting steering arms and pivoted to the front axle, front wheels mounted on the stub axles, a coupling bar secured between the steering arms and having an opening in its middle part, a draw bar having its rear end pivotally connected with the said frame by a vertical pivot and projecting through the slot in the front axle and engaging with the opening in the coupling bar so as to steer the front wheels, and means for supporting the front end of the draw bar from the frame and permitting it to rock horizontally.

3. In a truck, a frame, an arch-shaped front axle having its middle and upper part pivoted to the frame by a horizontal pivot and provided at its ends with pivoted stub axles and ground wheels mounted thereon, a forked radius rod having its middle and rear part pivoted to the frame in line with the axle pivot and having its front and lower end portions connected to the end portions of the axle, said radius rod being inclined downwardly and forwardly, a drawbar having its rear end pivotally connected with the said frame by a vertical pivot, and means for connecting the drawbar with the stub axles so as to steer the front wheels.

4. In a truck, a frame, a front axle pivoted by a horizontal pivot to the frame, a crossbar secured to the frame to the rear of the front axle and having a projecting anchor member, a forked radius rod having its middle and rear part pivoted to the anchor member and its front ends secured to the end portions of the front axle, an anchor bar having its rear end secured to the said crossbar, a brace secured between the front end portion of the anchor bar and the said frame, stub axles pivoted to the front axle, front wheels mounted on the stub axles, a draw bar pivoted by a vertical pivot to the said anchor bar, and means for connecting the draw bar with the stub axles so as to steer the front wheels.

5. In a truck, a frame, a front axle pivoted by a horizontal pivot to the frame, front ground wheels supporting the front axle, rocking frames having their middle parts pivotally connected with the frame and arranged longitudinally of it and one at each side thereof, and a pair of ground wheels mounted at the end portions of each rocking frame.

6. A truck as set forth in claim 5, and having also an endless band of jointed members extending over and around each pair of rear ground wheels to increase the surface in contact with the ground.

7. In a truck, a frame, a front axle pivoted by a horizontal pivot to the frame, ground wheels supporting the front axle, a rear axle secured to the frame, rocking frames pivoted betwen their ends on the end portions of the rear axle, and a pair of rear ground wheels mounted at the end portions of each rocking frame.

8. In a truck, a frame, rocking frames pivotally connected with the frame between their ends and arranged longitudinally of it and one at each side thereof, and a pair of ground wheels mounted at the end portions of each rocking frame.

9. In a truck, a frame, an arch-shaped front axle having its middle and upper part pivoted to the frame by a horizontal pivot and provided at its ends with pivoted stub axles and ground wheels mounted thereon, a drawbar arranged above the level of the stub axles and having its rear end connected with the frame by a vertical pivot, and coupling devices which connect the drawbar with the stub axles so as to steer the ground wheels by means of the drawbar.

10. In a truck, a frame, a front axle pivoted at its middle part to the frame by a horizontal pivot and provided at its ends with pivoted stub axles and ground wheels mounted thereon, a drawbar having its rear end connected to the frame by a vertical pivot, and coupling devices which connect the drawbar with the stub axles so as to steer the ground wheels by means of the drawbar.

In testimony whereof I have affixed my signature.

HENRY O. SCRANTON.